(12) United States Patent
Sakamoto

(10) Patent No.: US 7,370,719 B2
(45) Date of Patent: May 13, 2008

(54) INSTRUMENT PANEL CONSTRUCTION FOR A VEHICLE

(75) Inventor: Yasunori Sakamoto, Nasu-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 311 days.

(21) Appl. No.: 11/094,044

(22) Filed: Mar. 29, 2005

(65) Prior Publication Data
US 2005/0217913 A1 Oct. 6, 2005

(30) Foreign Application Priority Data
Mar. 31, 2004 (JP) ............................. 2004-103518

(51) Int. Cl.
*B60K 37/00* (2006.01)

(52) U.S. Cl. ......................................... 180/90; 296/70

(58) Field of Classification Search ............ 180/90; 296/70
See application file for complete search history.

(56) References Cited

U.S. PATENT DOCUMENTS 4,474,391 A * 10/1984 Matsuno et al. ............ 280/752
5,431,442 A * 7/1995 Tomita et al. ............... 280/752
5,934,744 A * 8/1999 Jergens et al. .............. 296/192
6,250,678 B1 * 6/2001 Yoshinaka et al. .......... 280/752
6,371,551 B1 * 4/2002 Hedderly .................... 296/192
6,648,402 B2 * 11/2003 Scheib et al. ............ 296/203.02

FOREIGN PATENT DOCUMENTS

JP 10-273072 10/1998
JP 2003-072421 3/2003

* cited by examiner

*Primary Examiner*—Eric Culbreth
(74) *Attorney, Agent, or Firm*—Lahive & Cockfield, LLP; Anthony A. Laurentano, Esq.

(57) ABSTRACT

In order to eliminate a steering hanger beam and to take efficient advantage of the empty space within an instrument panel, an instrument panel construction includes a main instrument panel unit 50 which is formed with an open cross sectional shape, and which comprises a plate shaped upper surface member 51 which extends substantially in the horizontal direction of the body of the vehicle across its transverse direction, and a front surface member 52 which curves towards the passenger compartment of the vehicle from said upper surface member 51 and extends downwards substantially in the vertical direction; and in that this main instrument panel unit 50 is made as a single unit from magnesium alloy by a die casting process, and is fixed to left and right front pillars.

6 Claims, 6 Drawing Sheets

INSTRUMENT PANEL CONSTRUCTION FOR A VEHICLE

BACKGROUND OF THE INVENTION

1. Field of the Invention

The present invention relates to an instrument panel construction for a vehicle.

Priority is claimed on Japanese Patent Application No. 2004-103518, filed Mar. 31, 2004, the content of which is incorporated herein by reference.

2. Description of Related Art

Generally, a vehicle is provided with an instrument panel which extends in the transverse direction of the vehicle body, and various types of devices such as meters, audio equipment, air bags and the like are set into this instrument panel. Furthermore, in the prior art, in order to enhance the rigidity of the vehicle body, a steering hanger beam which extends completely across the transverse direction of the vehicle body has been provided forward of the instrument panel, with the steering column being fixed to this steering hanger beam.

As a prior art type instrument panel construction, there is a per se known type of instrument panel construction which is made from a resin of closed cross sectional form, in which equipment such as an air conditioning device or an air bag or the like is housed in the interior of the instrument panel which is made with a closed cross section. Furthermore, in this instrument panel, a bracket for supporting the steering is fixed to the vehicle body, and the steering column is fixed to this bracket.

Furthermore, as another type of instrument panel construction, there is per se known a structure in which the instrument panel and the steering hanger beam are joined together into one unitary member with resin.

With these type of instrument panel constructions, at the upper side portion of the instrument panel, there is provided a reinforcement portion which consists of a plurality of plate portions which are extend horizontally and which are arranged to have a certain gap between them in the vertical direction, and this reinforcement portion serves the function of a steering hanger beam. Furthermore, the steering column is inserted through an opening which is provided in the instrument panel, and is supported therein.

However, with the instrument panel construction described in the Japanese Patent Publication No. H10-273072, since the instrument panel is made with a closed cross sectional shape, there are limitations upon housing of the various equipment in its interior, so that it is not possible to take efficient advantage of the empty space within the instrument panel. Furthermore, since such equipment must be fitted within this closed cross sectional shape, the convenience during assembly is poor.

Moreover, with the instrument panel construction described in the Japanese Patent Publication No. 2003-72421, the reinforcement portion which is endowed with the function of acting as the steering hanger beam extends completely across the vehicle body in its transverse direction, so that it is not possible to house equipment in the interior of the instrument panel. Accordingly, it is not possible to take efficient advantage of the empty space within the instrument panel.

Thus, an objective of the present invention is to provide an instrument panel construction for a vehicle, which is able to take efficient advantage of the empty space within the instrument panel, and which is able to omit the steering hanger beam.

SUMMARY OF THE INVENTION

In order to solve the above described problems, the present invention is an instrument panel construction for a vehicle, characterized by involving a main instrument panel unit (for example, in the preferred embodiment described below, the main instrument panel unit 50) which is formed with an open cross sectional shape, and which obtains a plate shaped upper surface member (for example, in the preferred embodiment described below, the upper surface member 51) which extends substantially in the horizontal direction of the body of the vehicle across its transverse direction, and a front surface member (for example, in the preferred embodiment described below, the front surface member 52) which curves towards the passenger compartment of the vehicle from said upper surface member and extends downwards substantially in the vertical direction; and in that this main instrument panel unit is made from a light metal as a single unit, and is connected to left and right front pillars of the vehicle (for example, in the preferred embodiment described below, the front pillars 100*a* and 100*b*).

According to this type of structure, the mechanical strength of the main instrument panel unit, which is made from a light metal, is enhanced, and, since the left and right front pillars of the vehicle are connected together by this main instrument panel unit, it is possible to obtain sufficient vehicle body rigidity even though no steering hanger beam or the like is incorporated. Furthermore, it becomes possible to lighten the structure, since it is possible to eliminate the steering hanger beam. Moreover, since the main instrument panel unit has an open cross sectional shape, it is easily possible to house various types of device within the interior of this main instrument panel unit, and it is accordingly possible to take efficient advantage of this space.

Moreover, the invention is also characterized in that a steering column fitting portion (for example, in the preferred embodiment described below, the steering column support table 66), to which a steering column (for example, in the preferred embodiment described below, the steering column 9) is to be fitted, is provided upon said front surface member.

According to this type of structure, it becomes possible to support the steering column by directly attaching it to the main instrument panel unit.

And the invention is also characterized in that a cover panel (for example, in the preferred embodiment described below, the instrument panel pad 5) made from a resin material is fitted to the passenger compartment side of said main instrument panel unit.

According to this type of structure, it is possible to prevent direct contact between the passengers of the vehicle and the main instrument panel unit which is made from light metal.

And the invention is characterized in that a stepped portion (for example, in the preferred embodiment described below, the stepped portion 53) which bulges upwards towards the interior of the passenger compartment is provided to said upper surface member, and a portion which can easily be ruptured (for example, in the preferred embodiment described below, the easy-to-rupture portion 55 which can easily be ruptured) is provided in this stepped portion.

According to this type of structure, it is possible to specify in advance the location of the main instrument panel unit which is broken, when due to a collision or the like an excessive load in the direction towards the rear of the vehicle is imposed upon the lower stepped side of the stepped portion, or when an excessive load in the direction towards the front of the vehicle is imposed upon the upper stepped side of said stepped portion, as being this portion which is easily ruptured, and it is possible to alleviate the shock by the breakage of the portion which can easily be ruptured. Moreover since, when the portion which can easily be ruptured breaks, its lower stepped side slides under its higher stepped side, accordingly it is possible to prevent the broken surface thereof from being exposed to the passengers of the vehicle.

And the invention is characterized in that an air conditioning device (for example, in the preferred embodiment described below, the front defroster duct 21) is fitted inside said main instrument panel unit, and in that a defroster opening section (for example, in the preferred embodiment described below, the front defroster air ejection aperture 54) for a front window glass which is connected to said air conditioning device, whose opening edge almost coincides with the lower edge of said stepped portion, is provided in a portion of the lower side of said stepped portion along the transverse direction of the vehicle body, while said portion which can easily be ruptured is provided to the lower edge of said stepped portion.

Since, according to this type of structure, in the portion in which the defroster opening section is provided, the stepped portion and the stepped portion below it come to be in a state in which they are separated in advance by the defroster opening section, accordingly there is no requirement for providing any portion which can easily be ruptured to said portion.

And the invention is characterized in that said main instrument panel unit is made by a die casting formation process.

According to this type of structure, it is possible to manufacture the main instrument panel unit, which is of a relatively complex structure, accurately and moreover in an easy manner.

According to the invention, it is possible to obtain sufficient vehicle body rigidity due to the main instrument panel unit, even though no steering hanger beam or the like is incorporated, so that it is possible to eliminate the steering hanger beam. Furthermore, it becomes possible to lighten the structure, since it is possible to eliminate the steering hanger beam. Moreover, it is easily possible to house various types of devices within the interior of this main instrument panel unit, so that it is accordingly possible to take efficient advantage of the space within the interior of this main instrument panel unit.

According to the invention, it becomes possible to support the steering column by directly attaching it to the main instrument panel unit.

According to the invention, it is possible to prevent direct contact between the passengers of the vehicle and the main instrument panel unit which is made from light metal, so that it is possibly better to protect the passengers of the vehicle.

According to the invention, it is possible to specify in advance the location of the main instrument panel unit which is broken, when due to a collision or the like an excessive load in the direction towards the rear of the vehicle is imposed upon the main instrument panel unit, as being this portion which is easily ruptured, so that it is possible to alleviate the shock by the breakage of the portion which can easily be ruptured. Moreover since, when the portion which can easily be ruptured breaks, it is possible to prevent the broken surface thereof from being exposed to the passengers of the vehicle, accordingly the safety level is enhanced.

According to the invention, it becomes possible to simplify the structure, since, in the portion in which the defroster opening section is provided, there is no requirement for providing any portion which can easily be ruptured.

According to the invention, it is possible to manufacture the main instrument panel unit, which is of a relatively complex structure, accurately and moreover in an easy manner.

DETAILED DESCRIPTION OF THE INVENTION

In the following, detailed description of the instrument panel construction for a vehicle according to the present invention will be explained with reference to FIGS. 1 through 9.

Figure 1:
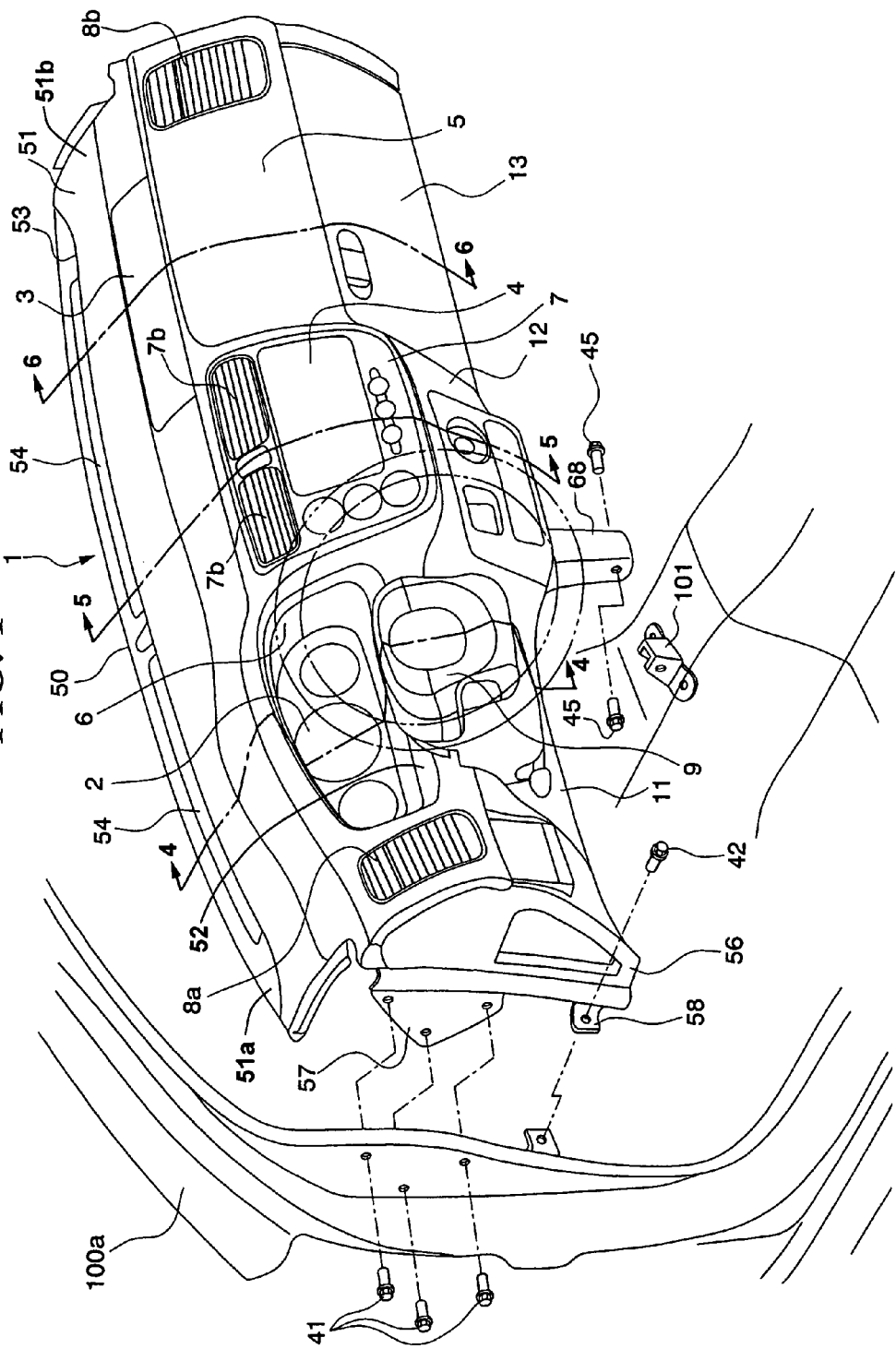
FIG. 1 is an assembled perspective view of a preferred instrument of the instrument panel construction according to the present invention.
Figure 2:
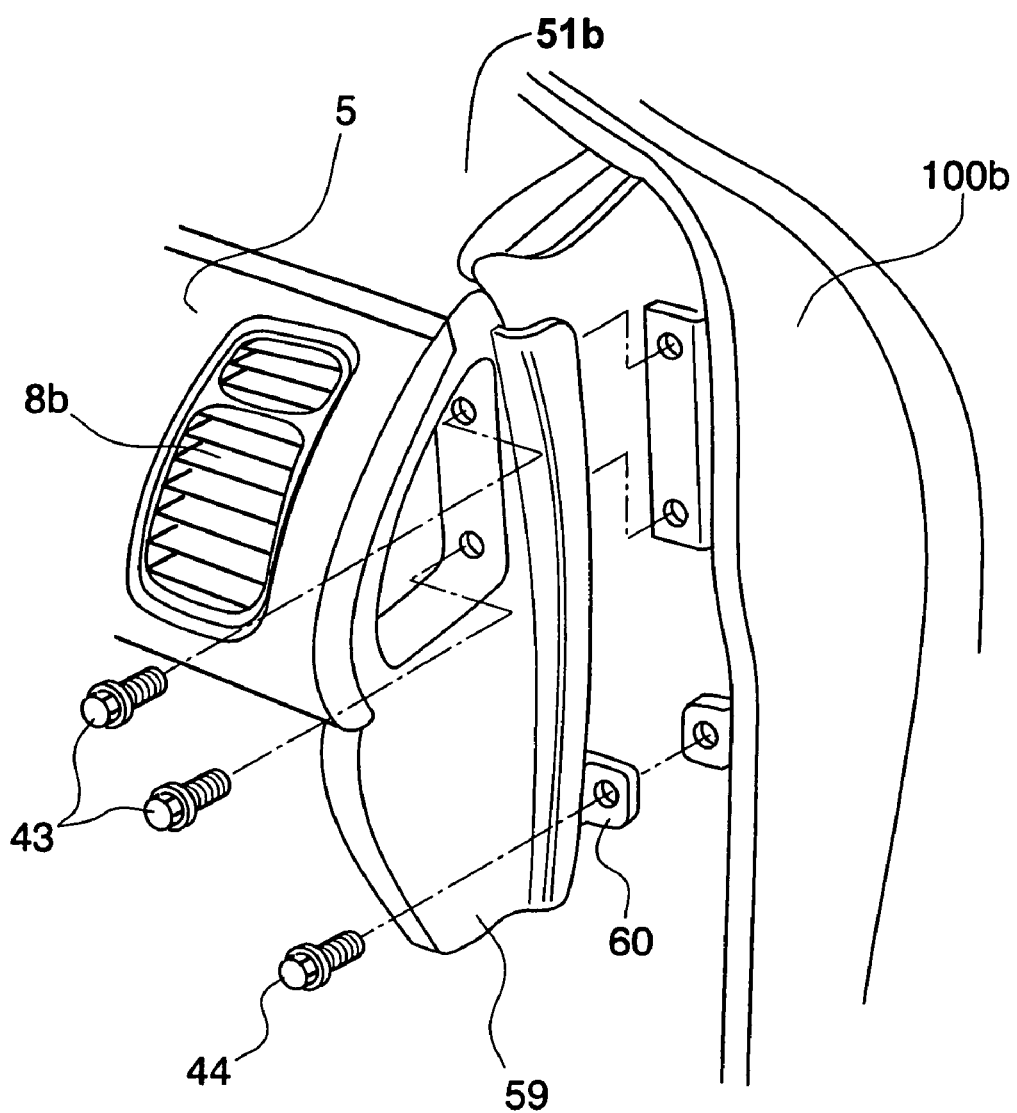
FIG. 2 is an exterior perspective view of a right end portion of said preferred embodiment instrument panel construction.
Figure 3:
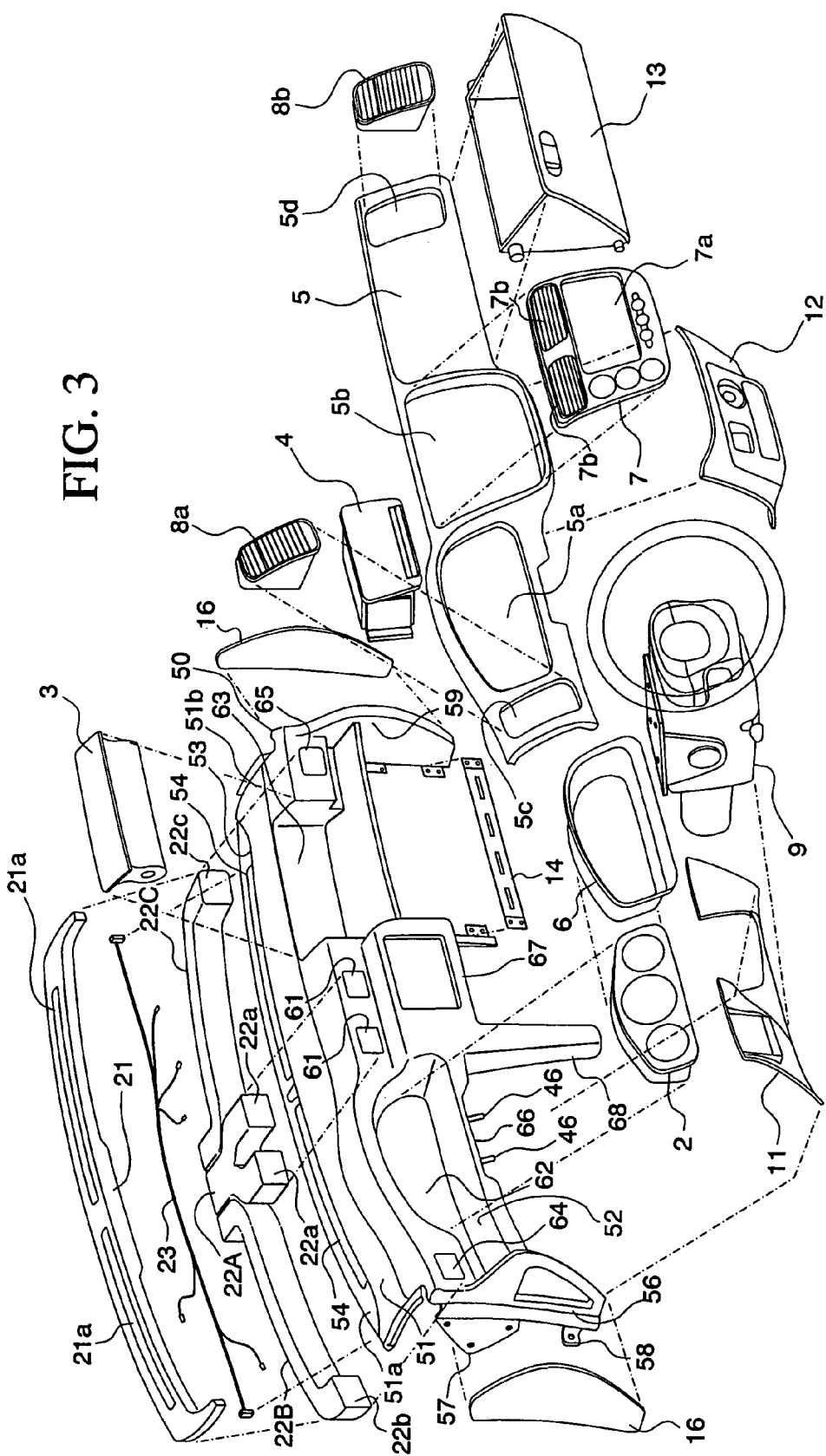
FIG. 3 is an exploded perspective view of said preferred embodiment instrument panel construction.
Figure 4:
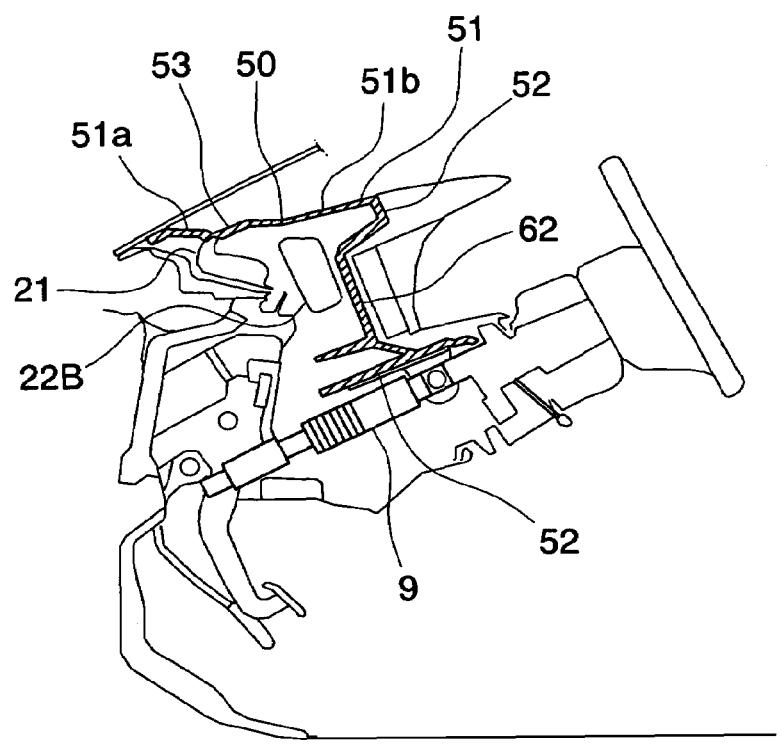
FIG. 4 is a sectional view of the instrument panel construction of FIG. 1, taken in a plane shown by the arrows 4-4 in FIG. 1.
Figure 5:
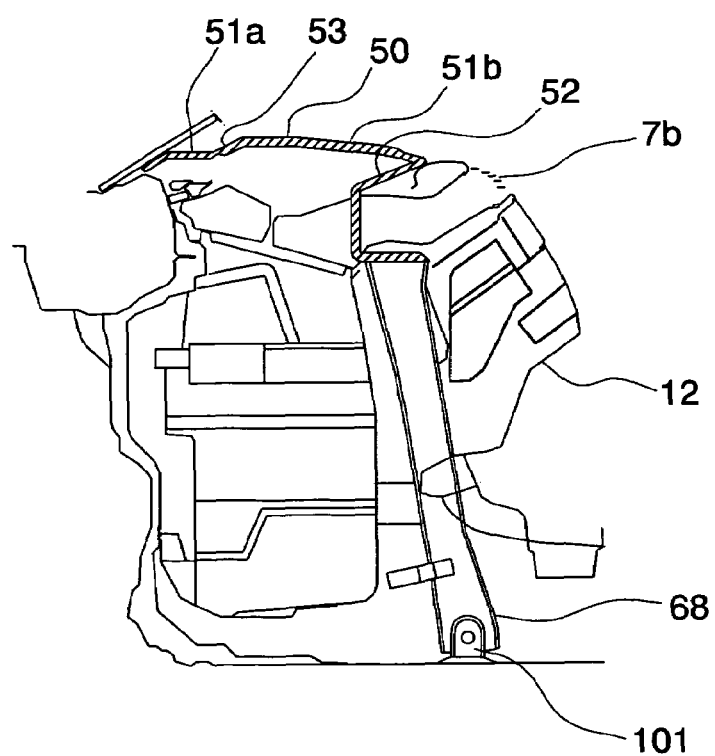
FIG. 5 is a sectional view of the instrument panel construction of FIG. 1, taken in a plane shown by the arrows 5-5 in FIG. 1.
Figure 6:
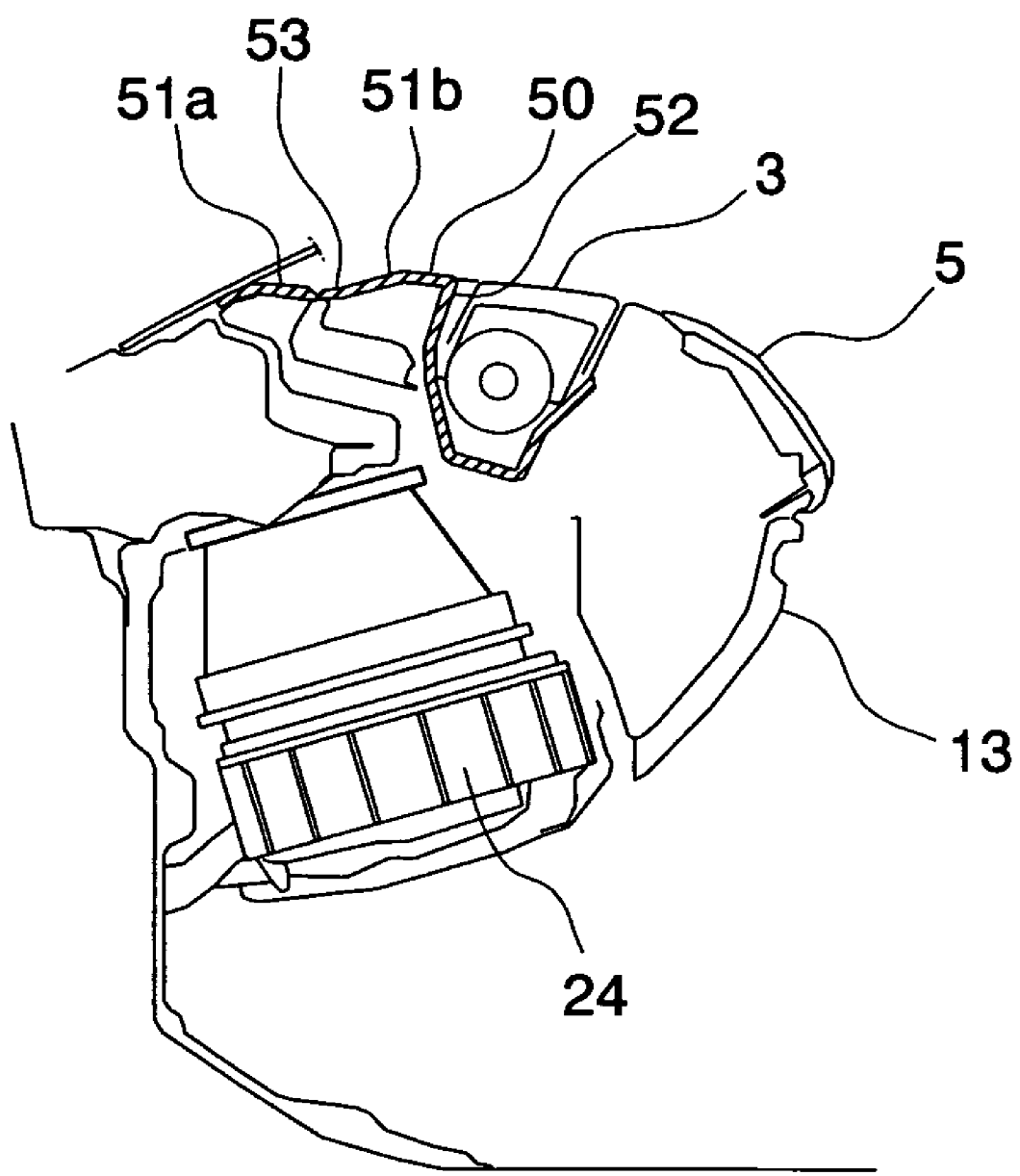
FIG. 6 is a sectional view of the instrument panel construction of FIG. 1, taken in a plane shown by the arrows 6-6 in FIG. 1.

The instrument panel 1 is arranged in the interior of the passenger compartment, adjacent to the front window glass (not shown in the drawings) across the entire width of the transverse direction of the vehicle body, and faces towards the driver's seat and the passenger seat; and its left and right end portions are fixed to the lower portions of respective left and right front pillars 100a and 100b, as shown in FIGS. 1 and 2. Hereinafter, in this detailed description, the driver's seat is positioned upon the left side of the vehicle as seen from its rear, while the passenger seat is located upon the right side thereof.

As shown in FIGS. 1 and 2, the instrument panel 1 obtains a main instrument panel unit 50 which is formed as a single unit (or which is molded integrally), and which is made by a die casting formation process from magnesium alloy as a source material, and in this main instrument panel unit 50, there are fitted a meter unit 2, an air bag 3, and audio and heater control unit 4 (hereinafter abbreviated as an audio unit), a steering column 9, a glove box 13, and so on.

Main instrument panel unit 50 obtains an upper surface member 51 which extends in a substantially horizontal direction across the transverse direction of the vehicle body, and a front surface member 52 which curves towards the rear of the vehicle (in other words, towards the passenger compartment side) from the upper surface member 51, and which extends in the substantially vertical direction. This main instrument panel unit 50 is formed, in cross section, as an open structure.

The upper surface member 51 obtains a stepped portion 53 which bulges upwards in the direction towards the rear of the vehicle (within the passenger compartment) and extends completely across the entire width of the vehicle body in its transverse direction. A lower step portion 51*a* is positioned closer to the front side of the vehicle (the lower step thereof) than the stepped portion 53. Front defroster air ejection apertures (defroster opening sections) 54 are long and thin openings which extend in the transverse direction of the vehicle body and opens on lower step portion 51*a*. An upper step portion 51*b* which is positioned more towards the rear of the vehicle than the stepped portion 53 (i.e. the upper step thereof) is formed in the upper surface member 51, and has a predetermined curved shape in cross section.

Figure 7:
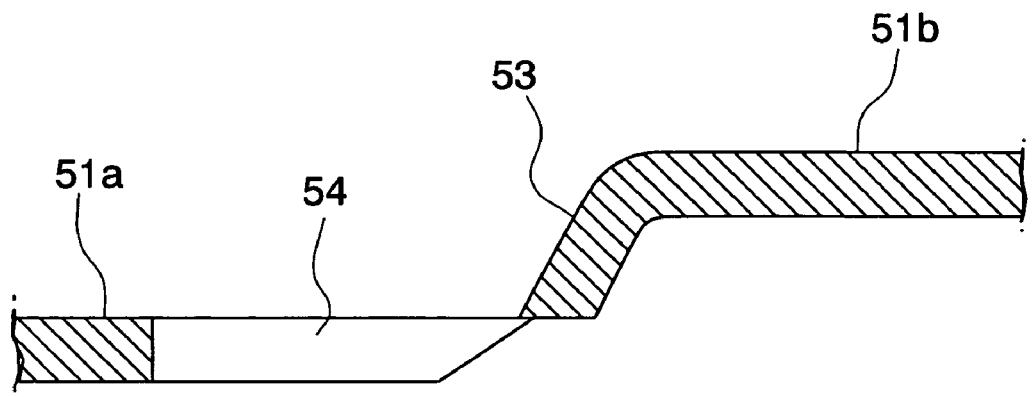
FIG. 7 is a sectional view of an upper surface member of said main instrument panel unit before it has been ruptured.
Figure 8:
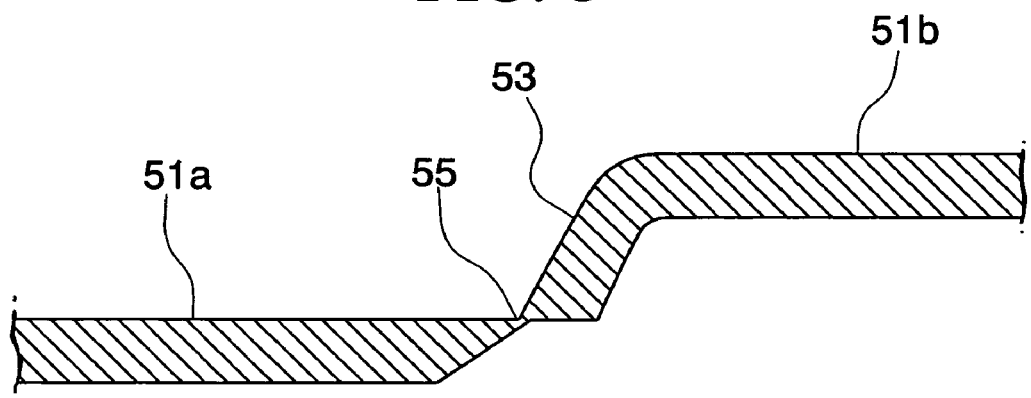
FIG. 8 is another sectional view of said upper surface member of said main instrument panel unit before it has been ruptured.

As shown in FIG. 7, the rear side opening edge of the front defroster air ejection aperture 54 is positioned so as almost to coincide with the lower edge of the stepped portion 53. Furthermore, as shown in FIG. 8, in the region in which the front defroster air ejection apertures 54 are not provided, at the lower edge of the stepped portion 53, there is provided an easy-to-rupture portion 55 which can easily be ruptured, and which is extremely thin, so that this easy-to-rupture portion 55 which can easily be ruptured connects to the rear edge of the lower step portion 51*a*.

At the left end portion of the front surface member 52, there are provided a side wall member 56 which extends towards the rear of the vehicle, a bracket 57 which extends towards the front of the vehicle, and a bracket 58 which extends outwards in the transverse direction of the vehicle body; and, at the right end portion of the front surface member 52, there are provided a side wall member 59 which extends towards the rear of the vehicle and a bracket 60 which extends outwards in the transverse direction of the vehicle body. As shown in FIG. 1, the left side brackets 57 and 58 are fixed to the left side front pillar 100*a* by bolts 41 and 42, while, as shown in FIG. 2, the right side wall member 59 and the bracket 60 are fixed to the right side front pillar 100*b* by bolts 43 and 44.

Two air ejection apertures 61, 61, which are located roughly in the central upper portion of the front surface member 52, are openings which face towards the rear of the vehicle and a meter reception concave portion 62 is formed on the left side of these air ejection apertures 61, 61, while an air bag reception concave portion 63 is formed to open upward at the right side of these air ejection apertures 61, 61. Furthermore, air ejection apertures 64 and 65 are provided to the upper left side of the meter reception concave portion 62, and to the upper right side of the air bag reception concave portion 63.

A steering column support table (a steering column fitting portion) 66 is formed upon the front surface member 52, below the meter reception concave portion 62, so as to slant at a predetermined angle. An audio unit fitting frame portion 67 is provided below the air ejection apertures 61, 61 so as to extend downwards in the vertical direction, while a stay 68 is provided as extending vertically downwards from the left end portion of this audio unit fitting frame portion 67. As shown in FIG. 1, the lower end of this stay 68 is fixed by bolts 45, 45 to a support portion 101 which is provided to the vehicle body frame (not shown in the figures). In other words, the left and right end portions of this main instrument panel unit 50 are connected to the front pillars 100*a* and 100*b*, while its central lower portion is connected to the vehicle body frame.

Within this main instrument panel unit 50, in other words below its upper surface member 51 and towards the front of the vehicle from its front surface member 52, there are stored a front defroster duct 21, ducts 22A through 22C for ejecting to the passenger compartment, a wiring harness 23, and the like. Air ejection openings 21*a*, 21*a* of the front defroster duct 21 are connected to the front defroster air ejection apertures 54, 54 of the main instrument panel unit 50, and central air ejection openings 22*a*, 22*a* of the duct 22A for ejecting to the interior of the passenger compartment are connected to the air ejection apertures 61, 61 of the main instrument panel unit 50, while left and right air ejection openings 22*b* and 22*c* of the ducts 22B and 22C for ejecting to the interior of the passenger compartment are connected to the left and right air ejection apertures 64 and 65 of the main instrument panel unit 50. It should be understood that air can be supplied to the front defroster duct 21 and to the ducts 22A through 22C for ejecting to the interior of the passenger compartment by an air conditioning unit 24 (refer to FIG. 6). Moreover, it should be understood that, in this preferred embodiment of the present invention, the front defroster duct 21 and the ducts 22A through 22C for ejecting to the interior of the passenger compartment constitute a portion of an air conditioning system.

A meter unit 2 which includes a speedometer and the like is fixedly housed in the meter reception concave portion 62 of the main instrument panel unit 50; an air bag 3 is fixedly housed in the air bag reception concave portion 63; and an audio unit 4 is fitted into the audio unit fitting frame portion 67.

Furthermore, an instrument panel pad (a cover panel) 5 which is made from a resin material is fitted upon the portion of the front surface member 52 of the main instrument panel unit 50 which faces towards the passenger compartment.

An opening 5*a* for a meter, an opening 5*b* for a center panel, and openings 5*c* and 5*d* for grilles are provided in the instrument panel pad 5. A meter visor 6 is inserted into and fixed in the opening 5*a* for a meter, and a meter unit 2 can be seen through this meter visor 6. A center panel 7 is inserted into and fixed in the opening 5*b* for a center panel, and a control panel of an audio unit 4 is fit into an opening 7*a* of this center panel 7, while the air ejection apertures 61, 61 of the main instrument panel unit 50 are connected to grilles 7*b*, 7*b* of said center panel 7. And grille units 8*a* and 8*b* are inserted into and fixed in the openings 5*c* and 5*d*, and these grille units 8*a* and 8*b* are connected to the air ejection apertures 64 and 65 of the main instrument panel unit 50.

A steering column 9 is fixed by bolts 46, 46, . . . to the steering column support table 66 of the main instrument panel unit 50.

A driver's seat lower cover 11 is fitted to the lower portion of the steering column support table 66 of the main instrument panel unit 50, while a center lower cover 12 is fitted to the lower portion of the audio unit fitting frame portion 67.

Along with a glove box 13 being fitted in a rotatable manner to the lower portion of the air bag reception concave portion 63 of the front surface member 52 of the main instrument panel unit 50, a glove box frame 14 is also fitted thereto.

Instrument panel side covers 16, 16 are fit to the left and right side wall members 56 and 59 of the front surface member 52.

According to this type of instrument panel construction, the mechanical strength of the main instrument panel unit 50 is enhanced due to the fact that it is formed as a single unitary member (molded integrally) from a light metal. Moreover, since the left and right front pillars 100*a* and 100*b* are connected together by this main instrument panel unit 50, accordingly it is possible to obtain sufficient rigidity for the vehicle body, even though no steering hanger beam which has been required in the prior art is provided.

Furthermore, since the steering column 9 is fitted directly to the steering column support table 66 of the main instrument panel unit 50, accordingly it is possible to omit the steering hanger beam, and it thus becomes possible to achieve further lightening. Since the main instrument panel unit 50 is mechanically strengthened in the manner which has been described above, no problem arises with respect to the strength by which the steering column 9 is supported.

Since the main instrument panel unit 50 is formed with a cross section which is open, it is easily possible to house various types of devices such as those described above in the space which is defined within said main instrument panel unit 50, so that it becomes possible to take efficient advantage of this space.

Figure 9:
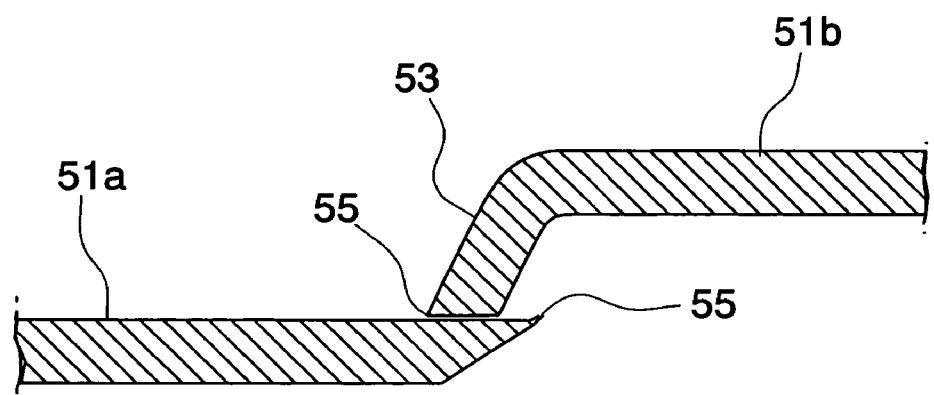
FIG. 9 is a sectional view of said upper surface member of said main instrument panel unit after it has been ruptured.

Due to a collision or the like, when an excessive load in the direction towards the rear of the vehicle is imposed upon the lower step portion 51*a* of the upper surface member 51 of the main instrument panel unit 50, or when an excessive load in the direction towards the front of the vehicle is imposed upon its upper step portion 51*b*, then, as shown in FIG. 9, the easy-to-rupture portion 55 breaks and the lower step portion 51*a* slides underneath the upper step portion 51*b*, so that it is possible to moderate the shock of the collision, thereby protecting the passengers of the vehicle. In other words, by providing the easy-to-rupture portion 55 in the stepped portion 53 of the main instrument panel unit 50, it is possible to adjust in advance the location at which the main instrument panel unit 50 will break when the impact is applied to it in the longitudinal direction of the vehicle, and, moreover, it is possible to make it of a shock absorbing construction, so that the safety during a collision is enhanced.

By providing the easy-to-rupture portion 55 at the lower edge of the stepped portion 53, it is possible for the lower step portion 51*a* to slide under the upper step portion 51*b* when this easy-to-rupture portion 55 is broken, accordingly it is possible to prevent exposure of the broken surface towards the people who are riding in the vehicle, so that the safety with respect to the vehicle passengers is further enhanced.

Since, in this preferred embodiment of the present invention, in the regions in which the front defroster air ejection apertures 54 are provided, the lower edge of the stepped portion 53 and the lower step portion 51 are in the state of already being separated by the front defroster air ejection apertures 54, accordingly it is not necessary to provide any portion such as the easy-to-rupture portion 55 in said regions, so that it becomes possible to simplify the construction.

Since the instrument panel pad 5 which is made from a resin material is provided at the passenger compartment side of the front surface member 52 of the main instrument panel unit 50, accordingly it is possible to prevent the passengers of the vehicle from coming into direct contact with the main instrument panel unit 50 which is made from magnesium alloy, so that it is possible thereby to protect passengers of the vehicle. Furthermore, it is also possible thereby to mitigate the shock which is imparted to the passengers of the vehicle, if they should impinge upon the instrument panel 1.

Since the main instrument panel unit 50 is made by die casting formation, accordingly it is possible to manufacture this main instrument panel unit 50 accurately and moreover easily, even though it has a complicated shape.

The surface of the instrument panel pad 5 can be covered with a resin outer coating, or with a resin material which has a cushioning quality. When this is done, not only is a soft feeling imparted to the surface of the instrument panel 1 which is presented to the interior of the passenger compartment, but also its shock absorbing characteristic is further enhanced. Moreover, it is also possible to cover the portions of the main instrument panel unit 50 which project into the interior of the passenger compartment with a resin outer coating, or with a resin material which has a cushioning quality.

About other preferred embodiments, it should be understood that the present invention is not to be considered as being limited to the preferred embodiment disclosed above. Other additions, omissions, substitutions, and modifications can be made without departing from the spirit or scope of the present invention. Accordingly, the invention is not to be considered as being limited by the foregoing description, and is only limited by the scope of the appended claims.

For example, the base material for the main instrument panel unit 50 is not limited to being magnesium alloy; some other light metallic material would be acceptable. Furthermore, the method by which this main instrument panel unit is formed is not limited to formation by die casting; other methods would be acceptable.

What is claimed is:

1. An instrument panel for a vehicle, comprising:
   a main instrument panel unit which is formed into an open cross sectional shape, comprising:
   an upper surface member which is formed to extend substantially in the horizontal direction of the body of the vehicle across a transverse direction and which is formed in a plate shape; the upper surface member comprising:
   a stepped portion which bulges upwards in the direction towards a passenger compartment side, the stepped portion comprising an upper step portion and a lower step portion connected to the upper step portion via a rupturable portion, wherein the rupturable portion ruptures when a load is imposed the upper surface member, the lower step portion being slidably movable in a horizontal direction to slide underneath the upper step portion when the rupturable portion ruptures, and
   a front surface member which is formed to curve inside of the upper surface member at the passenger compartment side of the vehicle and to extend downwards substantially in a vertical direction and which is connected to a support portion of the vehicle at a substantially center portion in a transverse direction, wherein
   the upper surface member and the front surface member are made from a metal as a single unit; and
   the main instrument panel unit is adapted to be connected to left and right front pillars of the vehicle.

2. The instrument panel according to claim 1, wherein the front surface member further comprises a steering column fitting portion to which a steering column is to be fit.

3. The instrument panel according to claim 1, further comprising a cover panel which is made from a resin material and is fit at the passenger compartment side of the main instrument panel unit.

4. The instrument panel according to claim 1, wherein the main instrument panel unit is sized and configured to accommodate an air conditioning unit and a defroster opening section for a front window glass is adapted to be connected to the air conditioning unit, an opening edge of the defroster opening section almost coincides with a lower edge of the stepped portion and the opening edge is provided at a lower side of said stepped portion along the transverse direction of the vehicle body, and the rupturable portion is provided at the lower edge of the stepped portion.

5. The instrument panel according to claim 1, wherein the main instrument panel unit is made by a die casting formation process.

6. The instrument panel according to claim 1, wherein the instrument panel unit is made from magnesium alloy.

\* \* \* \* \*